(12) United States Patent
Du et al.

(10) Patent No.: US 10,412,376 B2
(45) Date of Patent: Sep. 10, 2019

(54) APPARATUS FOR CONTROLLING A PIXEL ARRANGEMENT IN A DISPLAY UNIT

(71) Applicant: THOMSON LICENSING, Issy de Moulineaux (FR)

(72) Inventors: Lin Du, Beijing (CN); Peng Qin, Beijing (CN); Guanghua Zhou, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/655,043

(22) PCT Filed: Dec. 24, 2012

(86) PCT No.: PCT/CN2012/087348
§ 371 (c)(1),
(2) Date: Jun. 23, 2015

(87) PCT Pub. No.: WO2014/100960
PCT Pub. Date: Jul. 3, 2014

(65) Prior Publication Data
US 2015/0334379 A1  Nov. 19, 2015

(51) Int. Cl.
*H04N 13/315* (2018.01)
*H04N 13/398* (2018.01)
*H04N 13/31* (2018.01)
(Continued)

(52) U.S. Cl.
CPC ........... *H04N 13/315* (2018.05); *G02B 27/22* (2013.01); *H04N 13/31* (2018.05); *H04N 13/398* (2018.05);
(Continued)

(58) Field of Classification Search
CPC combination set(s) only.
See application file for complete search history.

(56) References Cited

U.S. PATENT DOCUMENTS 7,180,502 B2   2/2007   Marvit et al.
7,457,038 B2   11/2008  Dolgoff
(Continued)

FOREIGN PATENT DOCUMENTS

CN   102457751   5/2012
CN   102466906   5/2012
(Continued)

OTHER PUBLICATIONS

Search Report dated Oct. 3, 2013.

*Primary Examiner* — Lauren Nguyen
(74) *Attorney, Agent, or Firm* — Brian J. Dorini; Patricia A. Verlangieri

(57) ABSTRACT

A display unit may include a display screen device to display contents formed by pixels based on image data, a parallax barrier including pixels forming slit parts and mask parts and arranged to display an autostereoscopic presentation in combination with the display screen device, and a sensor to sense a rotation of the display unit about an axis perpendicular to a surface of the display screen device from a reference rotational position. A pixel arrangement of the display screen device and a pixel arrangement of the parallax barrier may be rotated depending on the rotation of the display unit from the reference rotational position.

5 Claims, 13 Drawing Sheets

(51) Int. Cl.
 *G02B 27/22* (2018.01)
 *H04N 13/312* (2018.01)
 *G02B 27/01* (2006.01)

(52) U.S. Cl.
 CPC .. *G02B 27/2214* (2013.01); *G02B 2027/0134* (2013.01); *H04N 13/312* (2018.05)

(56) References Cited

U.S. PATENT DOCUMENTS

| | | | |
|---|---|---|---|
| 7,719,552 B2 | 5/2010 | Karman | |
| 2008/0034321 A1 | 2/2008 | Griffin | |
| 2008/0043092 A1* | 2/2008 | Evans | G02B 27/2214 |
| | | | 348/36 |
| 2008/0231767 A1* | 9/2008 | Lee | G02B 27/2214 |
| | | | 349/15 |
| 2010/0245369 A1 | 9/2010 | Yoshino | |
| 2011/0242150 A1* | 10/2011 | Song | G02B 27/2214 |
| | | | 345/697 |
| 2012/0033046 A1* | 2/2012 | Ozaki | H04N 13/0409 |
| | | | 348/46 |
| 2012/0098931 A1 | 4/2012 | Wirtz | |
| 2012/0194751 A1 | 8/2012 | Lo et al. | |

FOREIGN PATENT DOCUMENTS

| | | | | |
|---|---|---|---|---|
| CN | 20-2406235 | * | 8/2012 | ............. H04N 13/00 |
| CN | 102625112 | | 8/2012 | |
| CN | 202406235 | | 8/2012 | |
| EP | 2090975 | | 8/2009 | |
| JP | 2010278979 | | 12/2010 | |
| JP | 2012039335 | | 2/2012 | |
| WO | 2012046686 | | 4/2012 | |

* cited by examiner

APPARATUS FOR CONTROLLING A PIXEL ARRANGEMENT IN A DISPLAY UNIT

This application claims the benefit, under 35 U.S.C. § 365 of International Application PCT/CN2012/087348, filed Dec. 24, 2012, which was published in accordance with PCT Article 21(2) on Jul. 3, 2014 in English.

TECHNICAL FIELD

The present invention relates to a display unit, an electronic apparatus, and a computer-readable storage medium that stores a program for rotatably displaying an autostereoscopic presentation.

BACKGROUND ART

According to autostereoscopy, a parallax barrier may be placed in front of an image source, such as an LCD (Liquid Crystal Display), in order to display an autostereoscopic presentation with added perception of three-dimensional depth without the need for a viewer to wear a special headgear or 3D (Three-Dimensional) glasses. The parallax barrier allows each eye of the viewer to see different sets of pixels, in order to create a sense of depth through parallax.

Examples of a cell type parallax barrier and a stereoscopic image display apparatus using the same are proposed in WO 2007/024118 A1.

An electronic apparatus using the conventional parallax barrier may provide a satisfactory autostereoscopic presentation when a display screen of the electronic apparatus is in the so-called "landscape" (or horizontal) orientation or "portrait" (or vertical) orientation with respect to the viewer, for example. However, when the viewer turns or rotates the electronic apparatus and changes the orientation of the display screen to an orientation other than the landscape or portrait orientation, for example, a quality of the autostereoscopic presentation may deteriorate and a satisfactory three-dimensional perception of depth may no longer be experienced by the viewer.

According to the electronic apparatus using the conventional parallax barrier, the viewer may experience a satisfactory three-dimensional perception of depth from the autostereoscopic presentation only when the display screen is at a predetermined orientation with respect to the viewer, such as the landscape or portrait orientation, for example.

Accordingly, one object of the present invention may be to provide a display unit, an electronic apparatus, and a computer-readable storage medium, capable of providing an autostereoscopic presentation with added perception of three-dimensional depth regardless of an orientation of a display screen with respect to a viewer.

SUMMARY OF THE INVENTION

According to one aspect of the present invention, a display unit may include a display screen device to display contents formed by pixels based on image data; a parallax barrier including pixels forming slit parts and mask parts and arranged to display an autostereoscopic presentation in combination with the display screen device; and a sensor to sense a rotation of the display unit about an axis perpendicular to a surface of the display screen device from a reference rotational position, wherein a pixel arrangement of the display screen device and a pixel arrangement of the parallax barrier are rotated depending on the rotation of the display unit from the reference rotational position.

According to another aspect of the present invention, an electronic apparatus may include a display unit including a display screen device to display contents formed by pixels based on image data, and a parallax barrier including pixels forming slit parts and mask parts and arranged to display an autostereoscopic presentation in combination with the display screen device; a sensor to sense a rotation of the display unit about an axis perpendicular to a surface of the display screen device from a reference rotational position; and a processing unit to perform a control that includes rotating a pixel arrangement of the display screen device and a pixel arrangement of the parallax barrier depending on the rotation of the display unit from the reference rotational position.

According to still another aspect of the present invention, a non-transitory computer-readable storage medium having stored therein a program for causing a computer to execute a control process for controlling an autostereoscopic presentation of a display unit, the control process including the steps of controlling a display screen device of the display unit to display contents formed by pixels based on image data; controlling a parallax barrier of the display unit to form slit parts and mask parts by pixels of the parallax barrier, which parallax barrier is arranged to display an autostereoscopic presentation in combination with the display screen device; sensing a rotation of the display unit about an axis perpendicular to a surface of the display screen device from a reference rotational position based on a signal from a sensor; and rotating a pixel arrangement of the display screen device and a pixel arrangement of the parallax barrier depending on the rotation of the display unit from the reference rotational position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

Figure 1:
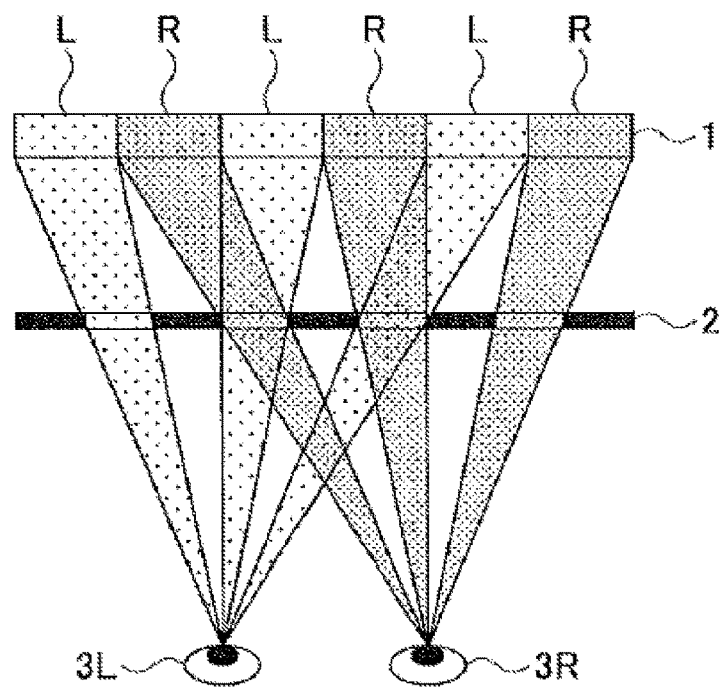
FIG. 1 is a diagram schematically illustrating an autostereoscopic display unit having a display screen device and a parallax barrier.

FIG. 1 is a diagram schematically illustrating an autostereoscopic display unit having an LCD 1 for displaying a presentation and a parallax barrier 2. In a parallax barrier system, a left eye 3L of a viewer sees only left image pixels (or left pixels) L of the LCD 1, and a right eye 3R of the viewer sees only right image pixels (or right pixels) R of the LCD 1, due to the parallax barrier 2 placed between the LCD 1 and the viewer. As a result, an autostereoscopic presentation is made, and the viewer may experience a three-dimensional perception of depth. The parallax barrier 2 may include slits that are arranged so that the right eye 3R sees only the right image pixels R and the left eye 3L sees only the left image pixels L. The image pixels R and L illustrated in FIG. 1 belong to a row of a matrix arrangement of pixels forming the LCD 1, for example.

Figure 2:
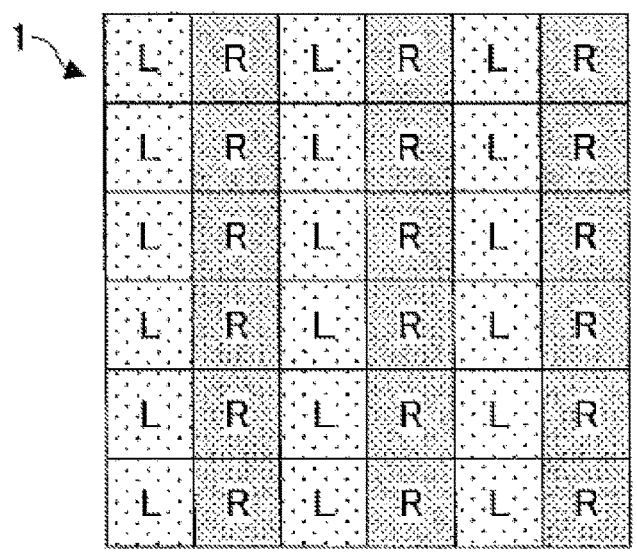
FIG. 2 is a diagram illustrating a part of LCD.
Figure 3:
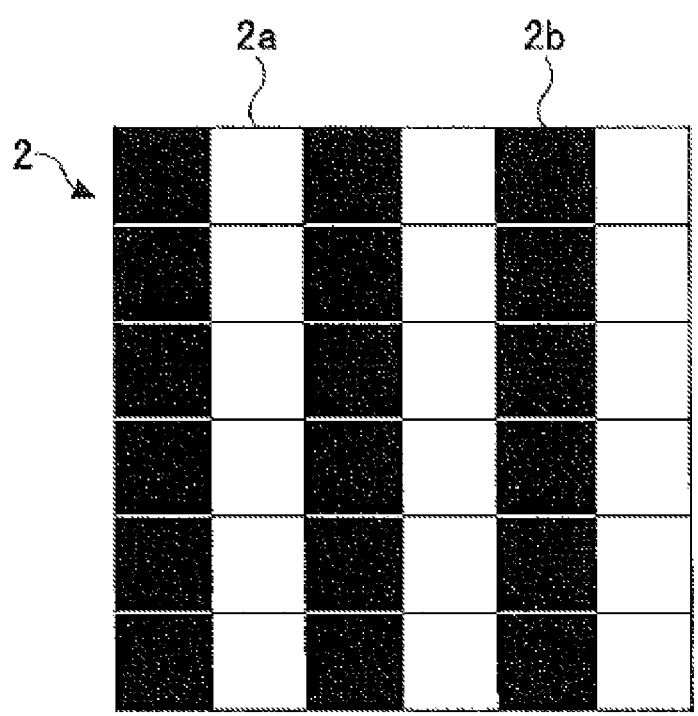
FIG. 3 is a diagram illustrating a part of parallax barrier.

FIG. 2 is a diagram illustrating a part of the LCD, and FIG. 3 is a diagram illustrating a part of the parallax barrier. The pixels R and L of the LCD 1 may have the matrix arrangement illustrated in FIG. 2. On the other hand, the parallax barrier 2 may have slit parts 2a and mask parts 2b illustrated in FIG. 3. The left eye 3L of the viewer may see only the left pixels L via the slit parts 2a, and does not see the right pixels R that are blocked by the mask parts 2b. The right eye 3R of the viewer sees only the right pixels R via the slit parts 2a, and does not see the left pixels L that are blocked by the mask parts 2b.

A resolution of the autostereoscopic display unit may be reduced compared to a corresponding 2D (Two-Dimensional) presentation, because the parallax barrier 2 allows each eye of the viewer to see different sets of pixels. In other words, the right eye of the viewer sees only the right pixels R of a virtual right camera image, and the left eye of the viewer sees only the left pixels L of a virtual left camera image. Hence, it may be advantageous to make the parallax barrier 2 switchable between a mode that provides the mask parts 2b to be partially transparent (or partially opaque), and a mode that provides no mask parts 2b to be fully transparent. For example, the parallax barrier 2 may be switched between these modes (for example, turned ON and OFF) by forming the parallax barrier 2 from a liquid crystal material in a manner similar to the LCD 1. The parallax barrier 2 is configured to be driven by the CPU 11 (FIG. 4) so that pixels of the parallax barrier 2 are switched between transparent state and non-transparent state on a pixel to pixel basis. In this sense, the parallax barrier 2 may be a so-called "active parallax barrier".

In a case in which the parallax barrier 2 is formed by an LCD, the LCD forming the parallax barrier 2 may be made partially transparent (or partially opaque) when making the autostereoscopic presentation of 3D video contents or composite contents including the 3D video contents, and may be made fully transparent when making the 2D presentation of 3D graphic contents. The 3D video contents refer to data to be displayed on the LCD 1 through the parallax barrier 2 in order to make the autostereoscopic presentation with the three-dimensional perception of depth. The 3D graphic contents refer to data to be displayed on the LCD 1 in order to make the 2D presentation of 3D objects and the like. The composite contents refer to data including both the 3D video contents and the 3D graphic contents.

On the other hand, time-multiplexing of virtual right and left camera images forming the 3D graphic contents may increase the resolution of the parallax barrier system.

Figure 4:
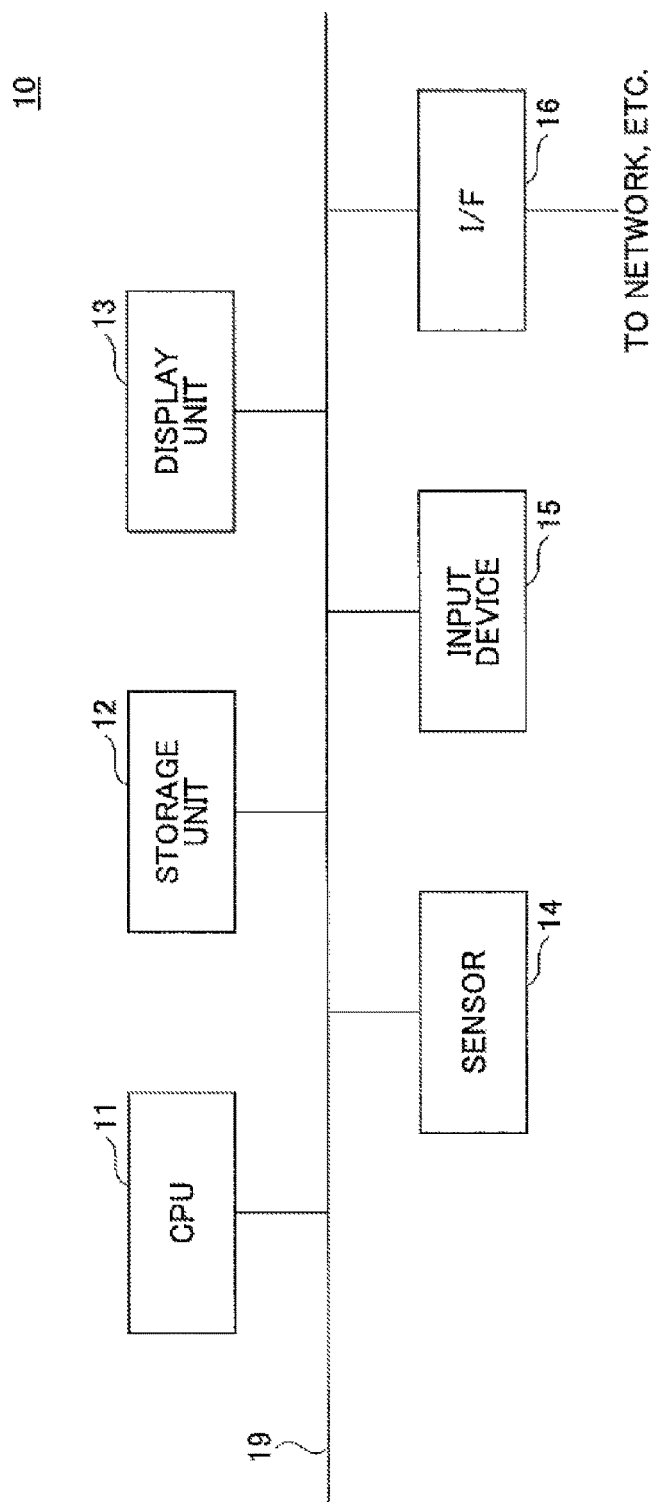
FIG. 4 is a block diagram illustrating an electronic apparatus according to a first embodiment of the present invention.

FIG. 4 is a block diagram illustrating an electronic apparatus according to a first embodiment of the present invention. An electronic apparatus 10 illustrated in FIG. 4 may include a CPU (Central Processing Unit) 11, a storage unit 12, a display unit 13, a sensor 14, an input device 15, and an interface (I/F) 16 connected via a bus 19. A memory (not shown) such as RAM (Random Access Memory) may be also connected to the CPU 11 via a direct connection or via the bus 19. Of course, the connection between the CPU 11 and other parts of the electronic apparatus 10 may be a direct connection or the like, and the connection is not limited to that using the bus 19. The display unit 13 and the input device 15 may be formed by a single unit integrally having functions of both the display unit 13 and the input device 15. An example of the single unit integrally having functions of both the display unit 13 and the input device 15 may include a touch-screen panel.

The CPU 11 is an example of a processing unit that controls the operation of the electronic apparatus 10, including the display operation of the display unit 13. The control of the display unit 13 by the CPU 11 may include driving the right pixels R of the LCD 1 based on virtual right camera image data and driving the left pixels L of the LCD 1 based on virtual left camera image data when making the autostereoscopic presentation, driving the pixels of the LCD 1 based on the image data when making a 2D presentation, driving (or turning ON) the backlight 5 when making a presentation, driving the pixels of the parallax barrier 2 to be partially opaque with respect to the pixels R and L of the LCD 1 when making the autostereoscopic presentation, and not driving the pixels of parallax barrier 2 to be transparent with respect to the pixels of the LCD 1 when making the 2D presentation. As will be described later, the control of the display unit 13 by the CPU 11 may further include rotating pixel arrangements of the LCD 1 and the parallax barrier 2 depending on the orientation of the display unit 13 with respect to the viewer, and remapping the pixels of the LCD 1 and the parallax barrier 2, depending on the orientation of the display unit 13 with respect to the viewer. The CPU 11 may generate control signals to control the LCD 1 and the parallax barrier 2 in the manner described above.

The storage unit 12 may store one or more programs to be executed by the CPU 11, and various data including the 3D video contents, the 3D graphic contents, the composite contents, and intermediate data obtained during computations performed by the CPU 11. The storage unit 12 may be formed by a semiconductor memory device, a storage unit that uses a magnetic recording medium, an optical storage unit that uses an optical recording medium, a magneto-optical storage unit that uses a magneto-optic recording medium, or any combination of such devices or units.

Figure 5:
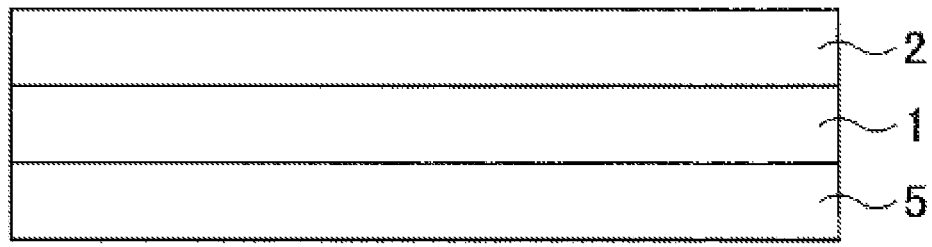
FIG. 5 is a side view schematically illustrating an example of a display unit according to the first embodiment of the present invention.

FIG. 5 is a side view schematically illustrating an example of the display unit in the first embodiment. As illustrated in FIG. 5, the display unit 13 may include a backlight 5, the LCD 1, and the parallax barrier 2. The backlight 5 may be turned ON when making a presentation and turned OFF when making no presentation, under the control of the CPU 11. The LCD 1 includes pixels to display images (or contents) represented by image data stored in the storage unit 12, or image data received via the I/F 16, under the control of the CPU 11. The parallax barrier 2 may be formed by an LCD, for example. In this case, the pixels of the parallax barrier 2 may be made partially transparent (or partially opaque) when making the autostereoscopic presentation, and may be made fully transparent when making a 2D display, under the control of the CPU 11.

In FIG. 5, the viewer views the presentation made by the display unit 13 from above the parallax barrier 2. Although FIG. 5 illustrates the backlight 5, the LCD 1, and the parallax barrier 2 as being successively stacked, a spacing (or gap) may be formed between the backlight 5 and the LCD 1, and a spacing (or gap) may be formed between the LCD 1 and the parallax barrier 2.

The sensor 14 may sense an orientation, that is, a three-dimensional posture, of the display unit 13 with respect to the viewer. For the sake of convenience, it is assumed in this example that the viewer views the display unit 13 in a viewing direction perpendicular to a display screen of the display unit 13. The display screen may be formed by a combination of the LCD 1 and the parallax barrier 2 overlapping each other. Hence, in this example, the sensor 14 may sense a rotational position or angle of the display unit 13 about an axis parallel to the viewing direction, and output an orientation signal indicating the orientation of the display unit 13. Examples of the sensor 14 may include a gyroscope, an orientation sensor that uses accelerometers and magnetometers, and the like.

Examples of the input device 15 may include a keyboard and the like, to be operated by the viewer (or user) when inputting data, instructions, and the like to the electronic apparatus 10. As mentioned above, the input device 15 may be a touch-screen panel so that the display unit 13 and the input device 15 can be integrally formed in a single unit.

The I/F 16 may provide an interface between the electronic apparatus 10 and an external apparatus (not illustrated) via a cable interface, a wireless interface, or a combination of cable and wireless interfaces. The I/F 16 may be connected to a network, such as the Internet, and the electronic apparatus 10 may receive data (for example, the 3D video contents, the 3D graphic contents, and the composite contents), instructions, programs, and the like via the network.

A program may cause a computer or a processing unit, such as the CPU 11, to execute a control process for controlling the parallax barrier 2 and the LCD 1, that is, for controlling an autostereoscopic presentation. Such a program may be stored in any suitable non-volatile computer-readable storage medium, including a semiconductor memory device, a magnetic recording medium, an optical recording medium, and a magneto-optic recording medium. In addition, such a program may be provided in a form of a plug-in with respect to another program for controlling the general operation of the display unit 13 or the electronic apparatus 10.

The electronic apparatus 10 may be portable, however, is not limited to such. Examples of the electronic apparatus 10 may include a cell phone, a smart phone, a tablet, a PDA (Personal Digital Assistant), a personal computer, a game console, a navigation system, a security system, a monitoring system, an attraction system in theme parks, and the like. In the case of the attraction system in theme parks, for example, the display unit may be fixed to a wall, a ceiling, a floor, and the like via any fixing device which allows that the orientation of the display unit can be variable.

Figure 6:
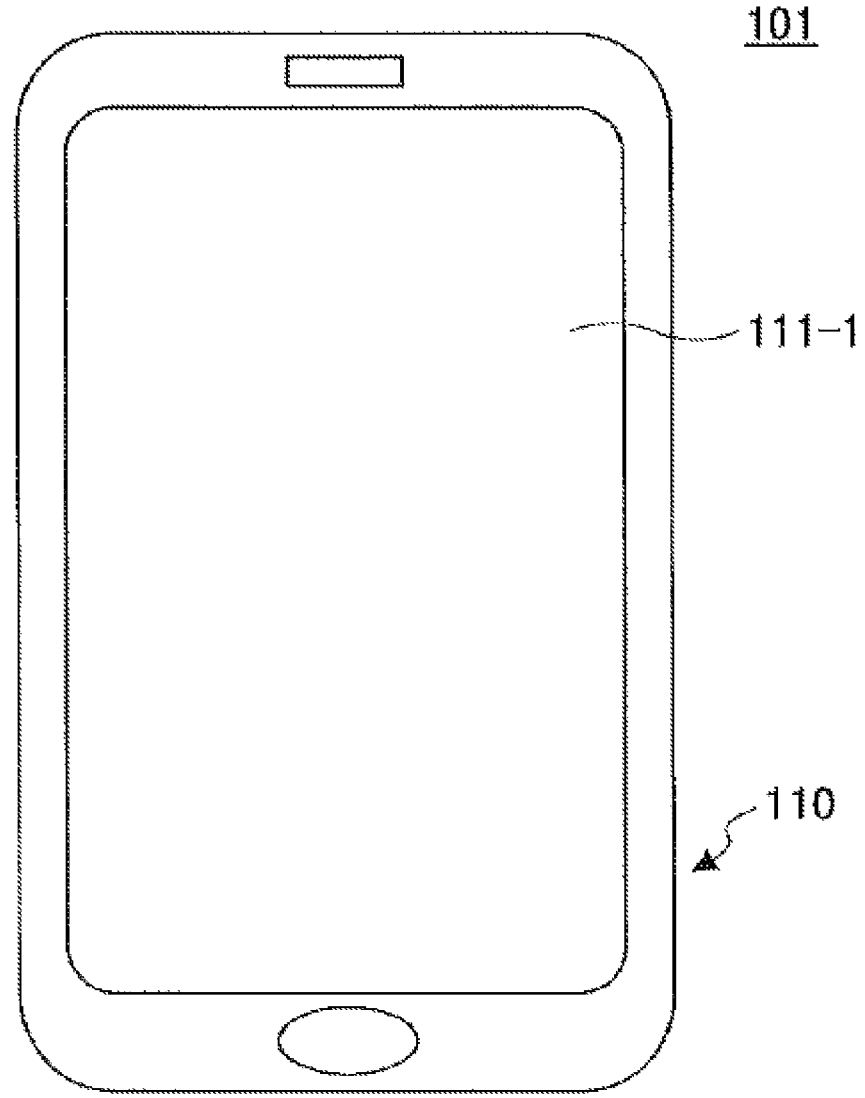
FIG. 6 is a front view illustrating an example of a smart phone.

FIG. 6 is a front view illustrating an example of the smart phone. A smart phone 101 illustrated in FIG. 6 may include a housing 110 that accommodates the structure illustrated in FIG. 4, among other things, such as a communication unit (for example, transmitter and receiver). A touchscreen panel 111-1 may be provided on one surface of the housing 110, in order to provide the functions of the display unit 13 and the input device 15.

Figure 7:
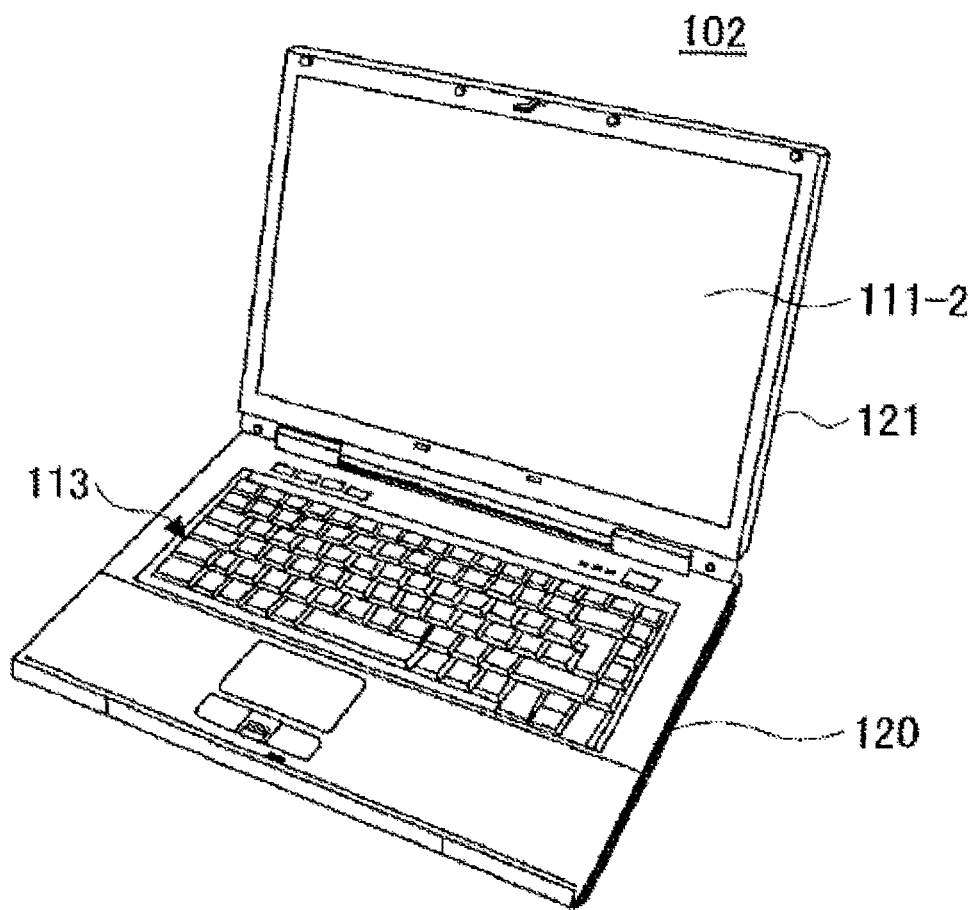
FIG. 7 is a perspective view illustrating an example of a personal computer.

FIG. 7 is a perspective view illustrating an example of the personal computer. A PC (Personal Computer) 102 illustrated in FIG. 7 may include a base part 120 and a lid part 121, that accommodate the structure illustrated in FIG. 4, among other things, such as a communication unit (for example, a modem). The base part 120 may include a keyboard 113, as an example of the input device 15. The lid part 121 may open and close with respect to the base part 120. A display screen 111-2 of the display unit 13 may be visible in the open state of the lid part 121 as illustrated in FIG. 7.

Figure 8:
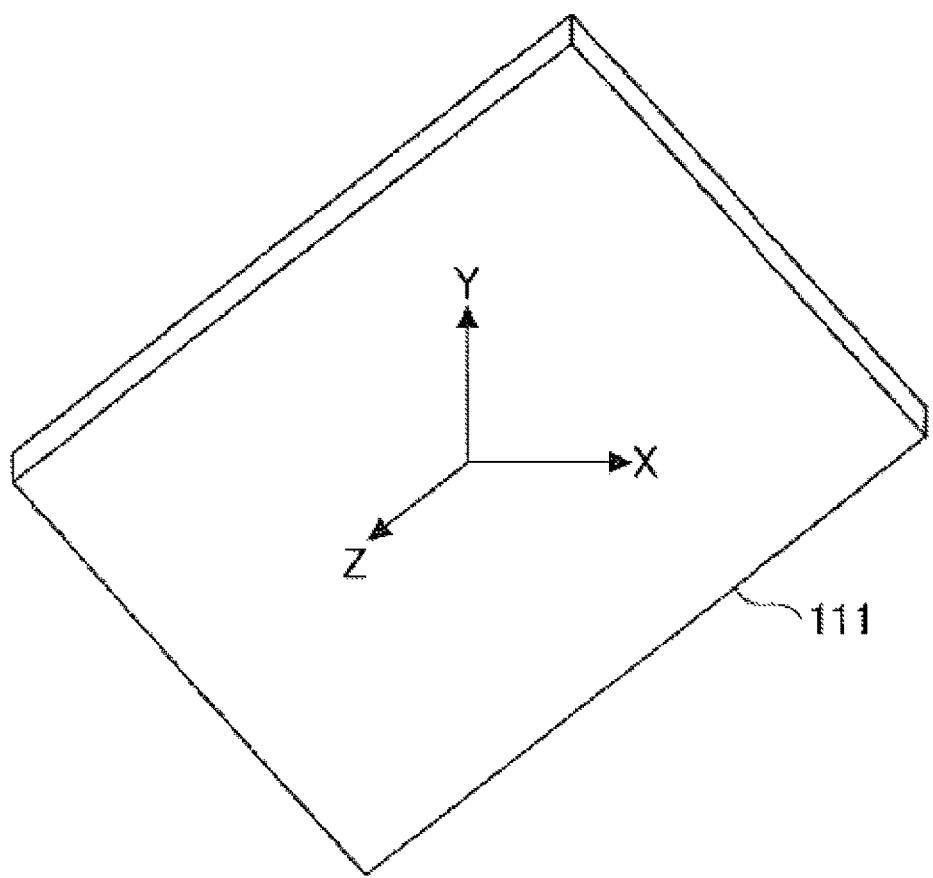
FIG. 8 is a diagram for explaining coordinates of the electronic apparatus.

FIG. 8 is a diagram for explaining coordinates of the electronic apparatus. This example employs the XYZ coordinate system. For the sake of convenience, it is assumed in this example that the viewer views the display unit 13 in a viewing direction, namely, a Z-direction, that is perpendicular to a display screen 111 of the display unit 13. Further, it is assumed in this example that the sensor 14 may sense a rotational position of the display unit 13 on an XY-plane (or a plane parallel to the XY-plane) about the Z-axis (or rotation center axis), and output the orientation signal indicating the orientation of the display unit 13. An X-direction, a Y-direction, and the Z-direction are perpendicular to each other. For example, the X-direction and the Y-direction may extend on the surface of the display unit 13 and the Z-direction may extend towards the viewer while the viewer watches a presentation on the display unit 13.

When the viewer turns or rotates the electronic apparatus 10 and changes the orientation of the display screen 111 such that the pixel arrangement of the LCD 1 and the pixel arrangement of the parallax barrier 2 are rotated from the states illustrated in FIGS. 2 and 3, respectively, the quality of the autostereoscopic presentation of the 3D video contents may deteriorate and a satisfactory three-dimensional perception of depth may no longer be experienced by the viewer, because the relationship described above with reference to FIGS. 1 and 2 may no longer be satisfied. The pixel arrangement of the LCD 1 may refer to the arrangement in which the right pixels R to display the virtual right camera image and the left pixels L to display the virtual left camera image are specified. On the other hand, the pixel arrangement of the parallax barrier 2 may refer to the arrangement in which the pixels to form the slit parts 2a and the pixels to form the mask parts 2b are specified.

Hence, in this embodiment, the CPU 11 rotates the pixel arrangement of the LCD 1 and the pixel arrangement of the parallax barrier 2 to compensate for the rotation of the display screen 111 sensed by the sensor 14. More particularly, when the display screen 111 is rotated counterclockwise on the XY-plane about the Z-axis by 45 degrees, for example, the pixel arrangement of the LCD 1 and the pixel arrangement of the parallax barrier 2 are rotated clockwise by 45 degrees, and the pixels R and L of the LCD 1 and the pixels of the parallax barrier 2 are remapped, in order to satisfy the relationship described above with reference to FIGS. 1 and 2. In other words, the remapping of the pixels of the LCD 1 and the parallax barrier 2 causes the left eye 3L of the viewer to see only the left pixels L of the LCD 1 via the slit parts 2a of the parallax barrier 2, and not see the right pixels R of the LCD 1 that are blocked by the mask parts 2b of the parallax barrier 2, while the remapping causes the right eye 3R of the viewer to see only the right pixels R of the LCD 1 via the slit parts 2a of the parallax barrier 2, and not see the left pixels L of the LCD 1 that are blocked by the mask parts 2b of the parallax barrier 2.

When remapping the pixels of the LCD 1 and the parallax barrier 2, the size of the rotated contents to be displayed may be variably adjusted to fit within a display area of the display screen 111. Alternatively, image portions of the rotated contents outside the display area of the display screen 111 may be discarded. For example, the remapping may be performed when the rotation of the display screen 111 on the XY-plane about the Z-axis, sensed by the sensor 14, is other than 0 degrees, 90 degrees, 180 degrees, and 270 degrees. For example, the rotary position of the display unit 13 about the Z-axis may be 0 degrees when the display unit 13 is at the landscape (or horizontal) orientation or at the portrait (or vertical) orientation with respect to the viewer.

Figure 9:
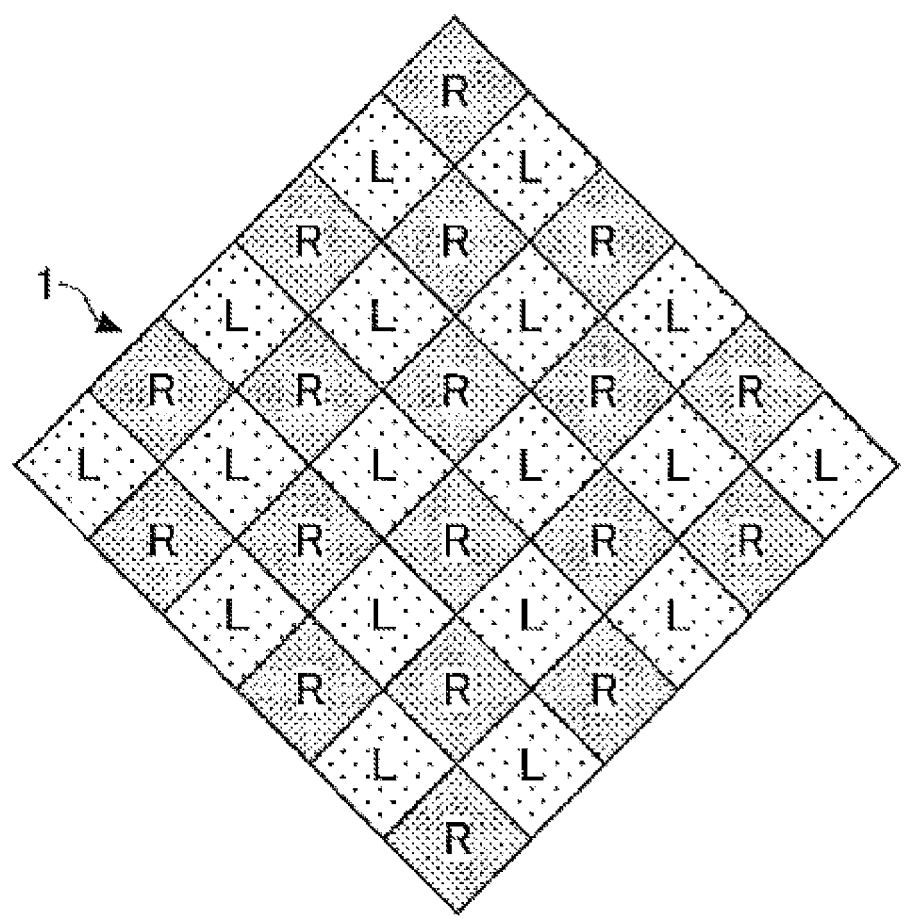
FIG. 9 is a diagram illustrating a part of a pixel arrangement of an LCD in a rotated state.

FIG. 9 is a diagram illustrating a part of the pixel arrangement of the LCD in the rotated state. FIG. 9 illustrates the rotated state of the pixel arrangement of the LCD 1 for the case in which the display screen 111 is rotated counterclockwise on the XY-plane by approximately 45 degrees about the Z-axis from the landscape (or horizontal) orientation or portrait (or vertical) orientation with respect to the viewer, for example.

Figure 10:
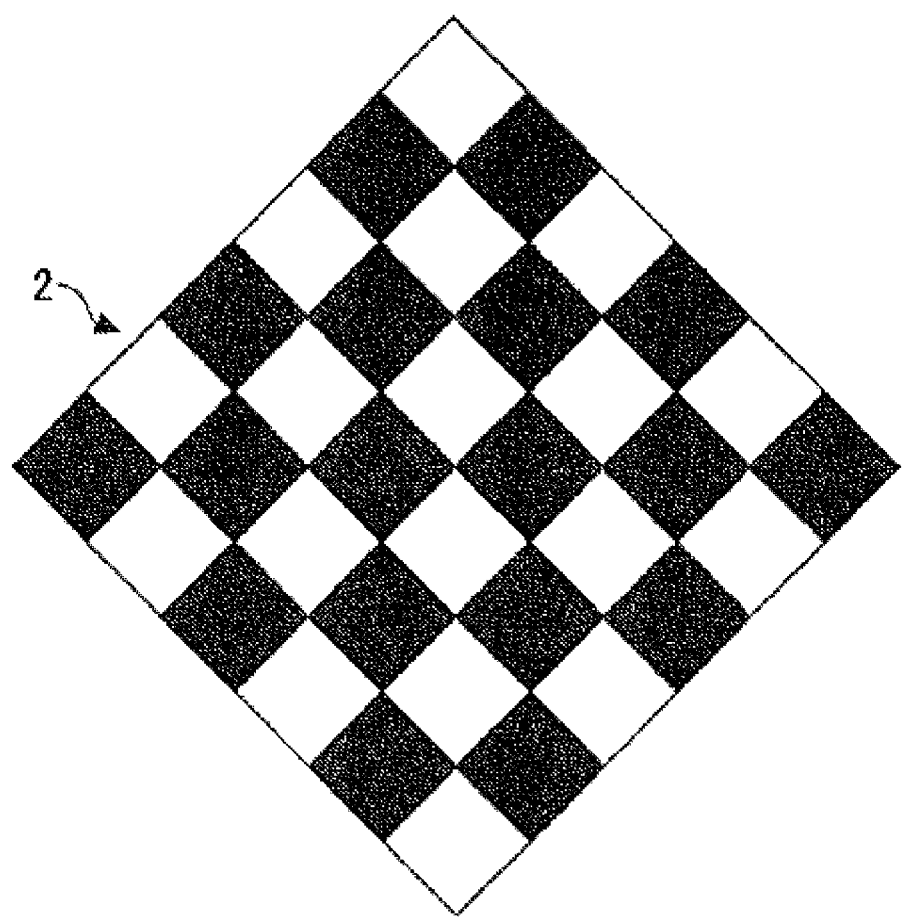
FIG. 10 is a diagram illustrating a part of a pixel arrangement of a parallax barrier in a rotated state.

FIG. 10 is a diagram illustrating a part of the pixel arrangement of the parallax barrier in the rotated state. FIG. 10 illustrates the rotated state of the pixel arrangement of the parallax barrier 2 for the case in which the display screen 111 is rotated counterclockwise on the XY-plane by approximately 45 degrees about the Z-axis from the landscape (or horizontal) orientation or portrait (or vertical) orientation with respect to the viewer, for example.

Figure 11:
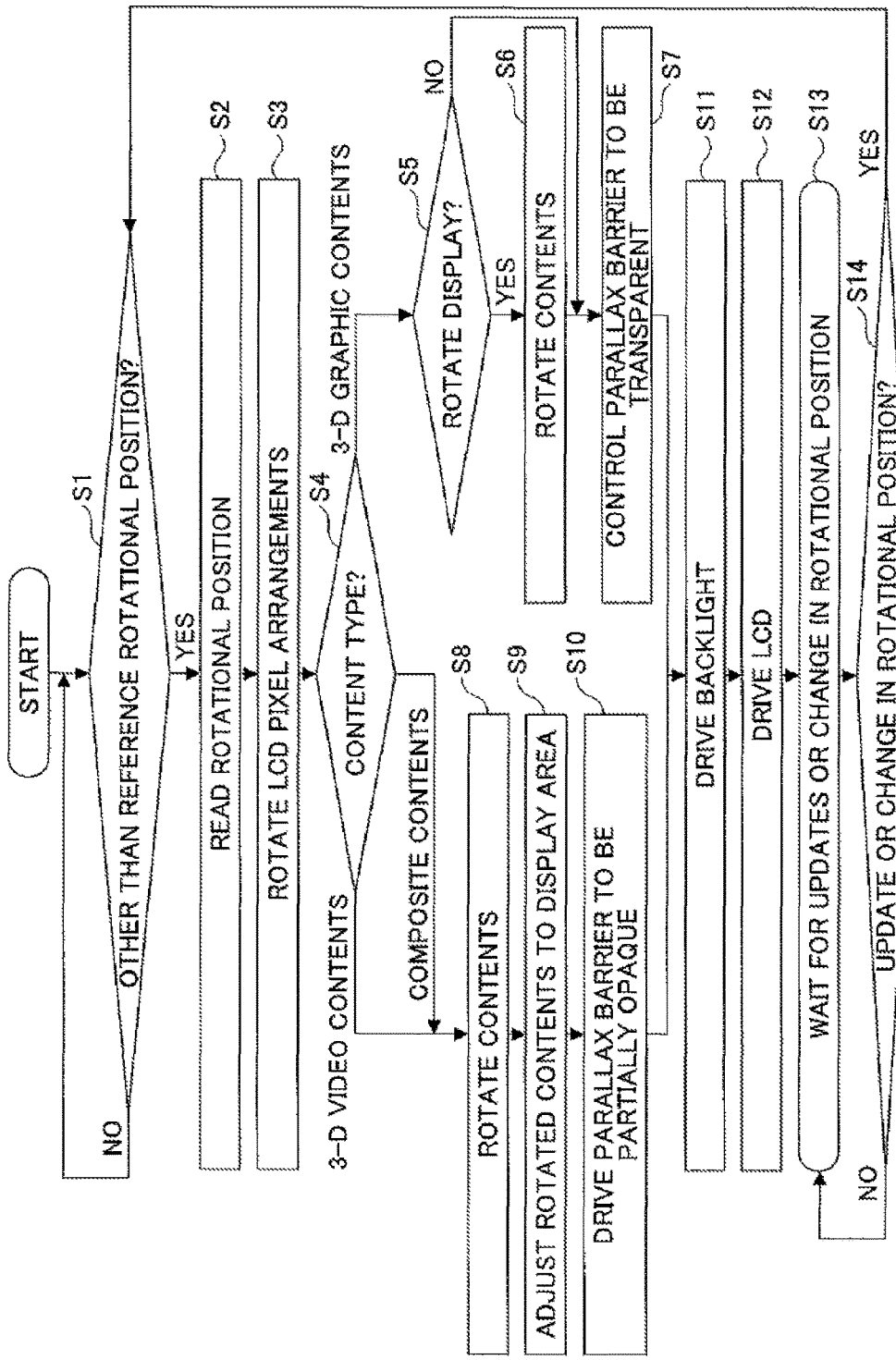
FIG. 11 is a flow chart for explaining an operation of the electronic apparatus.

FIG. 11 is a flow chart for explaining an operation of the electronic apparatus. For example, the operation illustrated in FIG. 11 may be implemented when the CPU 11 executes the program to perform the control process for controlling the LCD 1, the parallax barrier 2 and the backlight 5.

In FIG. 11, at step S1, it is determined by the CPU whether an orientation signal received from the sensor 14 indicates an orientation (rotational position or angle) of the display screen 111 (or display unit 13) on the XY-plane about the Z-axis, other than a reference rotational position or angle that may be 0 degrees, for example. The process is passed to step S2 when the decision result in step S1 is "YES".

At step S2, the CPU 11 reads the rotational position or angle of the display screen 111 on the XY-plane about the Z-axis based on the orientation signal from the sensor 14. For the sake of convenience, it is assumed that the read rotational position or angle of the display screen 111 on the XY-plane about the Z-axis is +rot_z degrees, where the positive sign "+" indicates a counterclockwise rotation. Then, at step S3, the CPU 11 calculates to rotate the pixel arrangement of the LCD 1 and the pixel arrangement of the parallax barrier 2 to compensate for the rotation of the display screen 111. More particularly, at step S3, the CPU 11 calculates to rotate the pixel arrangement of the LCD 1 and the pixel arrangement of the parallax barrier 2 by −rot_z degrees, where the negative sign "−" indicates a clockwise rotation, and the CPU 11 remaps the pixels R and L of the LCD 1 and the pixels of the parallax barrier 2 in order to satisfy the relationship described above with reference to FIGS. 1 and 2. As a result of the remapping of the pixels of the LCD 1 and the parallax barrier 2, the left eye 3L of the viewer may see only the left pixels L of the LCD 1 via the slit parts 2a of the parallax barrier 2, and the right eye 3R of the viewer may see only the right pixels R of the LCD 1 via the slit parts 2a of the parallax barrier 2.

At step S4, the CPU 11 determines whether the image data to be displayed are the 3D video contents, the 3D graphic contents, or the composite contents. In other words, at step S4, the CPU 11 determines the type of the content. The process is passed to step S5 when the image data to be displayed are the 3D graphic contents. On the other hand, the process is passed to step S8 when the image data to be displayed are the 3D video contents or the composite contents. The image data for the 3D video contents and the composite contents include the virtual right camera image and the virtual left camera image. On the other hand, the image data for the 3D graphic contents do not include the virtual right camera image and the virtual left camera image. Hence, at step S4, the CPU 11 may determine whether the image data to be displayed are one of the 3D video contents and the composite contents, or the 3D graphic contents, by detecting whether the virtual right and left camera images exist in the image data. In a case in which the image data to be displayed are in conformance with the H.264/AVC standard, for example, a Stereo ESI message identifies the right and left camera images. Accordingly, at step S4, the CPU 11 may determine whether the image data to be displayed are one of the 3D video contents and the composite contents, or the 3D graphic contents, by detecting whether Stereo ESI message identifies the virtual right and left camera images.

At step S5, the CPU 11 determines whether the display of the 3D graphic contents is to be rotated, based on a default setting or a setting input by the viewer, for example. When the determination result in step S5 is "YES", the CPU 11 rotates the 3D graphic contents to be displayed by −rot_z degrees at step S6. After step S6 or when the determination result in step S5 is "NO", the CPU 11 controls the parallax barrier 2 to be fully transparent with respect to the pixels of the LCD 1 at step S7, and then the process is passed to step S11. In this example, step S7 does not drive the pixels of the parallax barrier 2.

On the other hand, when the CPU 11 determines that the image data to be displayed are one of the 3D video contents and the composite contents at step S4, the CPU 11 rotates the pixel arrangement of the LCD 1 by −rot_z degrees at step S8, to be aligned with the rotated pixel arrangement of the parallax barrier 2, in order to satisfy the relationship described above with reference to FIGS. 1 and 2. As a result, the pixels R and L of the LCD 1 and the pixels of the parallax barrier 2 are remapped. Then, at step S9, the CPU 11 variably adjusts the size of the rotated contents to be displayed to fit within the display area of the display screen 111. During this adjustment at step S9, the CPU 11 may discard image portions of the rotated contents outside the display area of the display screen 111. Next, at step S10, the CPU 11 drives the pixels of the parallax barrier 2 to be partially opaque with respect to the pixels R and L of the LCD 1 in order to make the autostereoscopic presentation.

At step S11 following either step S7 or S10, the CPU 11 drives (or turns ON) the backlight 5. Alternatively, the backlight 5 may be kept turned ON thorough the entire steps if it is acceptable in view of power consumption.

At step S12, the CPU 11 drives the LCD 1 based on the contents to be displayed. When displaying the 3D video contents or the composite contents, the CPU 11 drives the right pixels R of the LCD 1 based on virtual right camera image data and drives the left pixels L of the LCD 1 based on virtual left camera image data in order to make the autostereoscopic presentation. On the other hand, when displaying the 3D graphic contents, the CPU 11 drives the pixels of the LCD 1 based on the image data of the 3D graphic contents in order to make the 2D presentation.

At step S13 following step S12, the CPU 11 waits for updates of the contents, or a change in the rotational position or angle of the display screen 111 (or display unit 13). At step S14, the CPU 11 determines whether the update or the change in rotational position of the display screen 111 occurred, and the process may return to step S1 after the content update or rotational position change occurs and the determination result in step S14 becomes "YES".

The order of driving the LCD 1, the parallax barrier 2 and the backlight 5 is not limited to the order in accordance with the process illustrated in FIG. 11.

Figure 12:
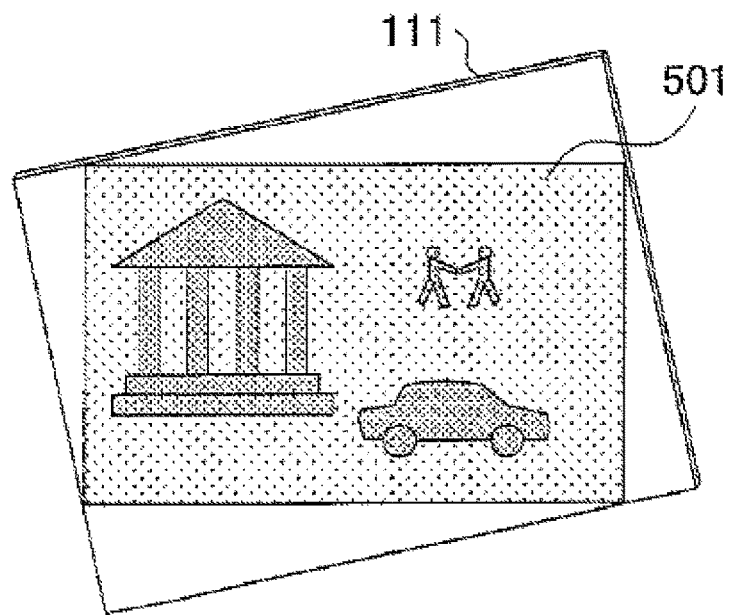
FIG. 12 is a diagram illustrating a rotated autostereoscopic presentation for 3D video contents.
Figure 13:
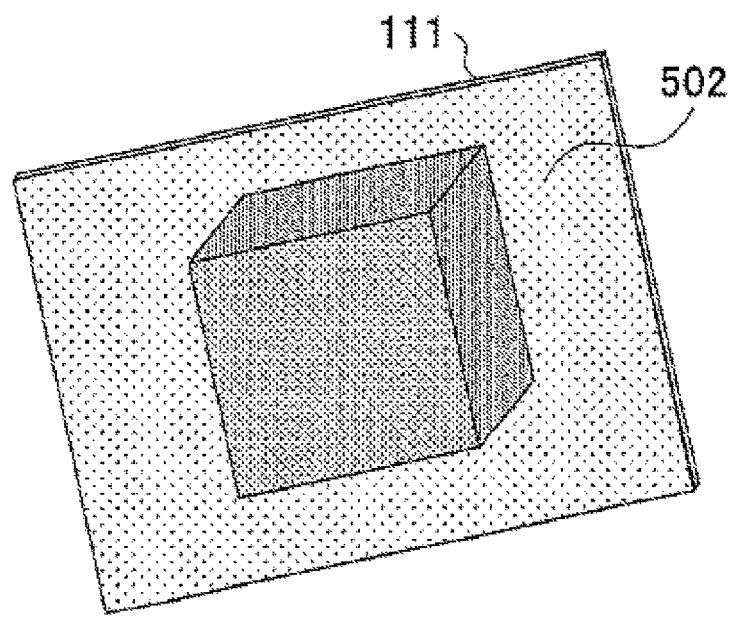
FIG. 13 is a diagram illustrating a rotated presentation for 3D graphic contents.
Figure 14:
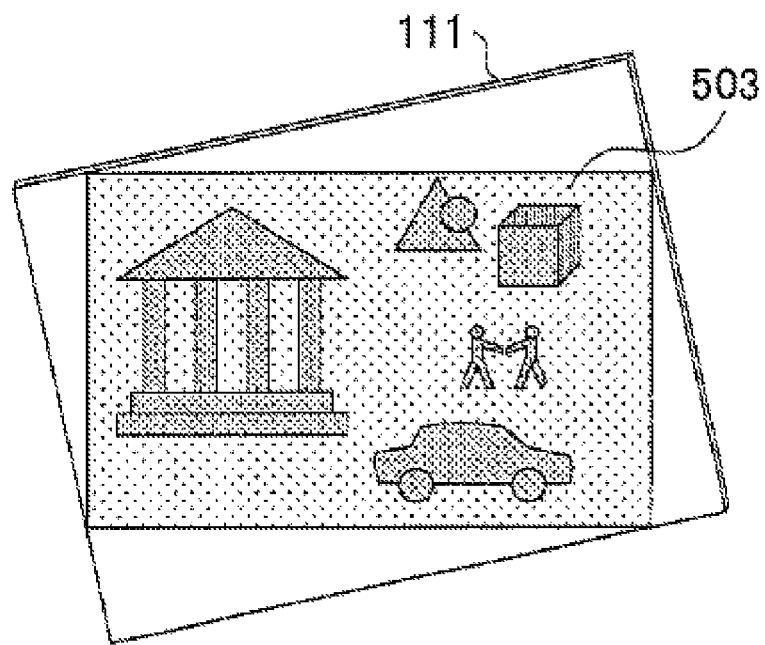
FIG. 14 is a diagram illustrating a rotated autostereoscopic presentation for a composite contents including the 3D video contents and the 3D graphic contents.

FIGS. 12 through 14 are diagrams for explaining examples of rotated presentations on the display screen. FIG. 12 is a diagram illustrating a rotated autostereoscopic presentation for 3D video contents. FIG. 12 illustrates a case in which the display screen 111 is rotated by +rot_z degrees on the XY-plane about the Z-axis, and an autostereoscopic presentation 501 is made by rotating the 3D video contents by −rot_z degrees and adjusting the size of the rotated 3D video contents to fit within the display area of the display screen 111.

FIG. 13 is a diagram illustrating a rotated presentation for 3D graphic contents. FIG. 13 illustrates a case in which the display screen 111 is rotated by +rot_z degrees on the XY-plane about the Z-axis, and a 2D presentation 502 of the 3D graphic contents is made on the rotated display screen 111. FIG. 13 illustrates an example in which the 3D graphic contents are not rotated with respect to the rotated display screen 111, however, the 2D presentation 502 may be made by rotating the 3D graphic contents by −rot_z degrees and adjusting the size of the rotated 3D graphic contents to fit within the display area of the display screen 111.

FIG. 14 is a diagram illustrating a rotated autostereoscopic presentation for a composite contents including the 3D video contents and the 3D graphic contents. FIG. 14 illustrates a case in which the display screen 111 is rotated by +rot_z degrees on the XY-plane about the Z-axis, and an autostereoscopic presentation 503 of the 3D video contents within the composite contents is made by rotating the composite contents by −rot_z degrees and adjusting the size of the rotated composite contents to fit within the display area of the display screen 111.

Figure 15:
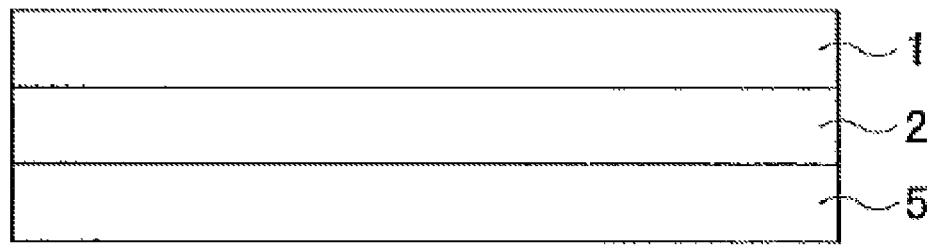
FIG. 15 is a side view schematically illustrating an example of the display unit according to a second embodiment of the present invention.

In the first embodiment described above, the parallax barrier 2 is placed in front of a display screen device as an image source that displays an image represented by image data. However, the parallax barrier 2 may be placed behind the display screen device when a light transmitting-type display screen device is used. FIG. 15 is a side view schematically illustrating an example of the display unit in a second embodiment. In FIG. 15, those parts that are the same as those corresponding parts in FIG. 5 are designated by the same reference numerals, and a description thereof will be omitted.

In the display unit 13 illustrated in FIG. 15, the parallax barrier 2 is placed behind the LCD 1 as the display screen device. In other words, the parallax barrier 2 may be placed between the LCD 1 and the backlight 5. In this case, the light from the backlight 5 passing the slit parts 2a of the parallax barrier 2 may pass through the right pixels R to be viewed only by the right eye 3R of the viewer, while the light from the backlight 5 passing the slit parts 2a of the parallax barrier 2 may pass through the left pixels L to be viewed only by the left eye 3L of the viewer. Hence, the autostereoscopic presentation with the three-dimensional perception of depth may also be made in this second embodiment.

Although FIG. 15 illustrates the backlight 5, the parallax barrier 2, and the LCD 1 as being successively stacked, a spacing (or gap) may be formed between the backlight 5 and the parallax barrier 2, and a spacing (or gap) may be formed between the parallax barrier 2 and the LCD 1.

Figure 16:
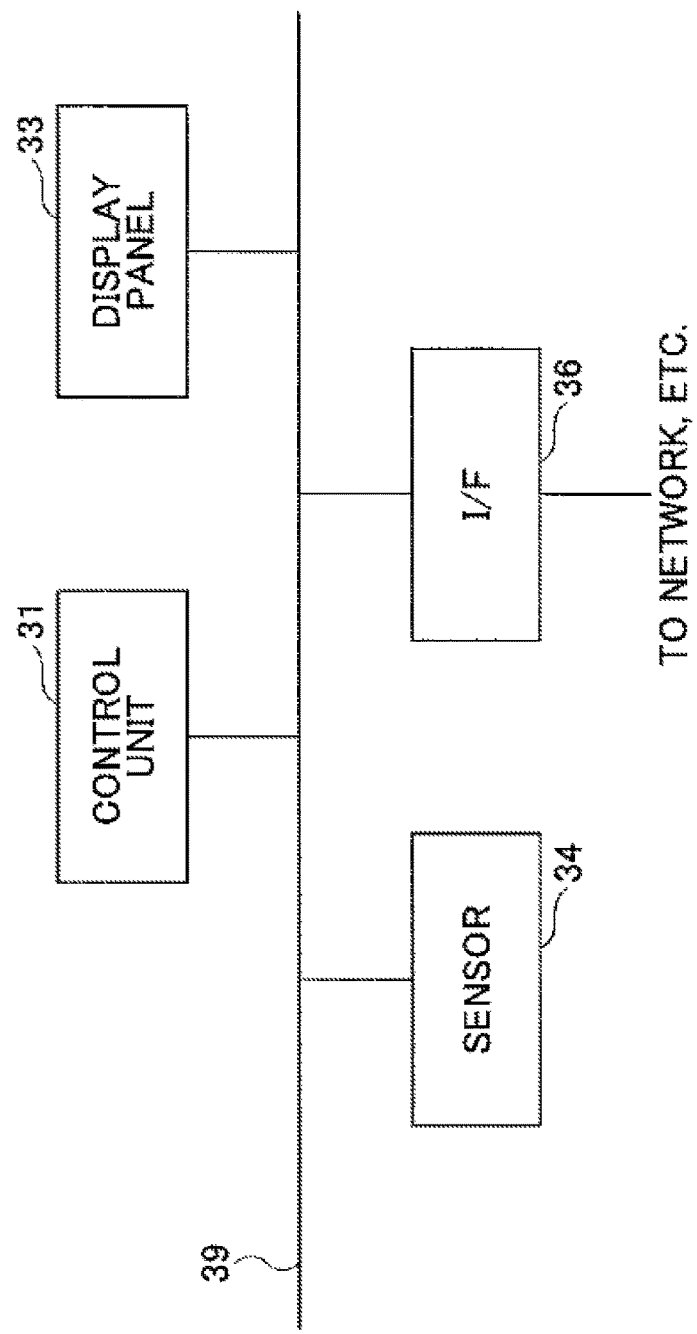
FIG. 16 is a block diagram illustrating a display unit according to a third embodiment of the present invention.

FIG. 16 is a block diagram illustrating a display unit in a third embodiment. In FIG. 15, those parts that are the same as those corresponding parts in FIG. 4 are designated by the same reference numerals, and a description thereof will be omitted.

A display unit (or display module) 130 illustrated in FIG. 16 may include a control unit 31, a display panel 33, a sensor 34, and an interface (I/F) 36 that are connected via a bus 39. Of course, the connection between the control unit 31 and other parts of the display unit 31 may be a direct connection or the like, and the connection is not limited to that using the bus 39. The display panel 33 may have the structure of the display unit 13 illustrated in FIG. 5 or FIG. 15. The sensor 34 may be the same as the sensor 14 illustrated in FIG. 4. The I/F 36 may provide an interface between the display unit 130 and an external apparatus (not illustrated) via a cable interface, a wireless interface, or a combination of cable and wireless interfaces.

The control unit 31 may include hardware, such as dedicated hardware, to perform the above described control process for controlling the LCD 1, the parallax barrier 2 and the backlight 5 of the display panel 33. Alternatively, the control unit 31 may be formed by a combination of a processing unit and a storage unit and/or a memory such as a RAM, and a program stored in the storage unit may cause the processing unit to execute the above described control process for controlling the LCD 1, the parallax barrier 2 and the backlight 5 of the display panel 33.

In each of the embodiments described above, the resolution of the pixels of the LCD 1 and the resolution of the pixels of the parallax barrier 2 may be the same, or be approximately the same. However, in order to provide a satisfactory resolution of the autostereoscopic presentation with the three-dimensional perception of depth, even when the display screen 111 is rotated on the XY-plane about the Z-axis from the reference rotational position or angle, for example, the resolution of the pixels of the parallax barrier 2 may preferably be higher than the resolution of the pixels of the LCD 1.

Further, it may be seen from FIGS. 9 and 10 that a pitch (or interval) of the pixels in both the vertical and horizontal directions (hereinafter also referred to as a "pixel pitch") increases when the display screen 111 is rotated from the reference rotational position or angle, when compared to the pixel pitch illustrated in FIGS. 2 and 3. Because the resolution may be improved by decreasing the pixel pitch, it may be preferable to set the pixel pitch to a relatively small value.

In other words, it may be preferable to set the pixel pitch of the pixels of the LCD 1 and the pixel pitch of the pixels of the parallax barrier 2 to relatively small values, in order to make the resolution of the pixels of the LCD 1 and the resolution of the pixels of the parallax barrier 2 relatively high.

In the embodiments described above, the LCD is used as the display screen device, however, displays other than the LCD, such as a plasma display, an OELD (Organic Electro-Luminescence Display), and the like may be used as the image source. The backlight and process for controlling the backlight may be omitted depending on the kind of display that is used for the display screen device. Similarly, although the LCD is used as the parallax barrier in the described embodiments, devices capable of selectively realizing opaque pixels and transparent pixels on a pixel to pixel basis with respect to the pixels of the display screen device may be used as the parallax barrier.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A display unit comprising:
   a display screen device configured to display contents formed by a plurality of pixels based on image data;
   a parallax barrier including a plurality of pixels in a pixel arrangement forming slit parts and mask parts and configured to display an autostereoscopic presentation in combination with the display screen device;
   a sensor configured to detect a rotation of the display unit about an axis perpendicular to a surface of the display screen device from a reference rotational position; and
   a processor, wherein an arrangement of the plurality of pixels of the display screen device and the pixel arrangement of the parallax barrier are configured to rotate in a first direction in response to detection of the rotation of the display unit in a second direction opposite to the first direction from the reference rotational position by the sensor, the rotation of the pixel arrangement of the display screen device and parallax barrier is equal in magnitude and opposite in direction to the rotation of the display unit, so that the contents formed by the pixels of the display screen device and the slit parts and mask parts formed by the pixels of the parallax barrier are remapped to compensate for the rotation of the display unit, wherein the pixels of the mask parts of the parallax barrier are at least partially opaque in a first mode and transparent in a second mode,
   wherein a resolution of the pixel arrangement of the parallax barrier is higher than a resolution of the pixel arrangement of the display screen device.

2. The display unit as claimed in claim 1, wherein the processor variably adjusts a size of the contents to be displayed to fit within a display area of the display screen device of the rotated display unit.

3. The display unit as claimed in claim 1, wherein the processor controls the pixel arrangement of the display screen device and the pixel arrangement of the parallax barrier based on the rotation of the display unit from the reference rotational position detected by the sensor.

4. An electronic apparatus comprising:
   a display unit including a display screen device configured to display contents formed by a plurality of pixels based on image data, and a parallax barrier including a plurality of pixels in a pixel arrangement forming slit parts and mask parts and configured to display an autostereoscopic presentation in combination with the display screen device;
   a sensor configured to the display unit to detect a rotation of the display unit about an axis perpendicular to a surface of the display screen device from a reference rotational position; and
   a processing unit, wherein an arrangement of the plurality of pixels of the display screen device and the pixel arrangement of the parallax barrier are configured to rotate in a first direction in response to detection of the rotation of the display unit in a second direction opposite to the first direction from the reference rotational position by the sensor, the rotation of the pixel arrangement of the display screen device and parallax barrier is equal in magnitude and opposite in direction to the rotation of the display unit, so that the contents formed by the pixels of the display screen device and the slit parts and mask parts formed by the pixels of the parallax barrier are remapped to compensate for the rotation of the display unit, wherein the pixels of the mask parts of the parallax barrier are at least partially opaque in a first mode and transparentin a second mode,
   wherein a resolution of the pixel arrangement of the parallax barrier is higher than a resolution of the pixel arrangement of the display screen device.

5. The electronic apparatus as claimed in claim 4, wherein the processing unit variably adjusts a size of the contents to be displayed to fit within a display area of the display screen device of the rotated display unit.

* * * * *

UNITED STATES PATENT AND TRADEMARK OFFICE
CERTIFICATE OF CORRECTION

| | |
|---|---|
| PATENT NO. | : 10,412,376 B2 |
| APPLICATION NO. | : 14/655043 |
| DATED | : September 10, 2019 |
| INVENTOR(S) | : Lin Du et al. |

It is certified that error appears in the above-identified patent and that said Letters Patent is hereby corrected as shown below:

In the Claims

Column 12, Line 47, "transparentin" should read --transparent in--

Signed and Sealed this
Tenth Day of January, 2023

Katherine Kelly Vidal
*Director of the United States Patent and Trademark Office*